(12) United States Patent
Janse

(10) Patent No.: US 6,546,099 B2
(45) Date of Patent: Apr. 8, 2003

(54) ARRANGEMENT FOR SUPPRESSING AN INTERFERING COMPONENT OF AN INPUT SIGNAL

(75) Inventor: Cornelis P. Janse, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 274 days.

(21) Appl. No.: 08/862,021

(22) Filed: May 22, 1997

(65) Prior Publication Data

US 2002/0159585 A1 Oct. 31, 2002

(30) Foreign Application Priority Data

May 31, 1996 (EP) ............................. 96201516

(51) Int. Cl.$^7$ ............................ H04M 1/00; H04M 9/00
(52) U.S. Cl. ......................... 379/406.01; 379/406.03; 379/406.05; 379/406.07; 379/406.12
(58) Field of Search .................. 379/406, 410, 379/414, 420, 406.01, 406.02, 406.05, 406.08, 406.09, 406.11, 406.12, 406.07, 406.14, 406.03

(56) References Cited

U.S. PATENT DOCUMENTS

| | | | | |
|---|---|---|---|---|
| 4,609,787 A | * | 9/1986 | Horna | 179/170.2 |
| 4,747,132 A | * | 5/1988 | Ibaraki et al. | 379/390 |
| 4,847,897 A | * | 7/1989 | Means | 379/390 |
| 4,947,361 A | | 8/1990 | Smith et al. | 364/724.09 |
| 4,984,265 A | * | 1/1991 | Connan et al. | 379/390 |
| 4,998,241 A | * | 3/1991 | Brox et al. | 370/32.1 |
| 5,014,294 A | * | 5/1991 | Kromenaiker et al. | 379/58 |
| 5,199,065 A | * | 3/1993 | Van Zitzewitz et al. | 379/389 |
| 5,307,405 A | * | 4/1994 | Sih | 379/410 |
| 5,390,250 A | | 2/1995 | Janse et al. | 379/410 |
| 5,475,731 A | * | 12/1995 | Rasmusson | 379/3 |
| 5,587,998 A | * | 12/1996 | Velardo, Jr. et al. | 370/289 |
| 5,663,955 A | * | 9/1997 | Iyengar | 370/291 |
| 5,745,564 A | * | 4/1998 | Meek | 379/410 |
| 5,790,657 A | * | 8/1998 | Fujiwara | 379/406 |
| 5,848,151 A | * | 12/1998 | Boudy et al. | 379/410 |

OTHER PUBLICATIONS

Newton's Telecom Dictionary, "Echo Return Loss", 1994.*

* cited by examiner

Primary Examiner—Allan Hoosain
(74) Attorney, Agent, or Firm—Jack D. Slobod

(57) ABSTRACT

In an acoustic echocanceller (6), an estimate of an echo signal is determined by an adaptive filter (10) and is subtracted from the input signal by a subtracter (14). The spectrum estimator (12) determines the frequency spectrum of the estimate of the echo signal, and the filter (16) filters the output signal of the subtracter (14) with a filter having a transfer function dependent on the spectrum determined by the estimator (12). The use of this combination results in a substantial improvement of the suppression of the echo signal.

9 Claims, 3 Drawing Sheets

ARRANGEMENT FOR SUPPRESSING AN INTERFERING COMPONENT OF AN INPUT SIGNAL

BACKGROUND OF THE INVENTION

1. Field of the Invention

The present invention is related to an arrangement for suppressing an interfering component in an input signal, said arrangement comprises means for deriving an estimate of the interfering component, subtraction means for determining a difference signal from the input signal and the estimate of the interfering component.

The present invention is also related to a loudspeaking telephone.

2. Description of the Related Art

An arrangement according to the preamble is known from U.S. Pat. No. 5,390,250.

This arrangement has widespread applications such as acoustic echo cancellers and noise cancellers. In these application there is an input signal in which an interfering component is present.

This interfering component can e.g. be a signal received from the far end in a loudspeaking telephone system. This far end signal is reproduced by a loudspeaker and is received by a microphone together with the near end signal e.g. from a local speaker. The input signal is now a signal derived from the output signal of the microphone. Because amplifiers are included in the transmit path, the loop gain for a specific frequency may be greater than 1, resulting in oscillations. If the acoustic feedback is smaller than 1, oscillation will not occur, but after a certain delay an echo of the signal applied to the input of the send path will appear at the output of the receive path via the far-end echo path. In telephony this means that a speaker hears his own voice delayed by a specific period of time. This phenomenon is experienced as extremely annoying especially in case of long delays.

To prevent this undesired feedback, in an acoustic echo canceller a replica of the undesired component is derived from the far end signal by means of an adaptive filter. Said replica is subtracted from the input signal, in order to eliminate the undesired component signal.

In case of a noise cancelling system the undesired component is a noise signal coming from a noise source, e.g. the noise of a running engine in a car. To eliminate the noise signal, a replica of the noise signal is derived from a reference noise signal received from a reference transducer by means of an adaptive filter. Again, this replica is subtracted from the input signal.

A problem with adaptive filters is the limited ability to track fast changes of the transfer function to be reproduced. Such a fast change can occur due to the movement of a person in the room in which the echo canceller or noise canceller is used. This can result into a reduced amount of suppression of the undesired component, a problem that is not satisfactorily solved up to now.

OBJECTS AND SUMMARY OF THE INVENTION

The object of the present invention is to provide an arrangement according to the preamble in which the ability to cope with changes in the transfer function to be reproduced by the adaptive filter has been drastically been improved.

Therefore the arrangement according to the invention is characterised in that the arrangement comprises means for determining an estimate for the frequency spectrum of the interfering component, and in that the arrangement comprises a filter having a reduced transfer function for at least one frequency range in dependence on the frequency spectrum of the interfering component.

By determining the frequency spectrum of the interfering component and by the use of a filter for selectively attenuating the frequency ranges corresponding to the frequency determined, an additional suppression of the interfering component is obtained. Experiments have shown surprisingly that the use of the above mentioned filter has almost no perceptual effect on the desired component of the input signal. Also these experiments revealed that the additional suppression of the undesired component, allows very rapid changes in the transfer function to be reproduced without hardly any perceptual effect.

An embodiment of the invention is characterised in that the filter is arranged for deriving an output signal from the difference signal.

If the filter is arranged for deriving the output signal in dependence on the difference signal, the operation of the means for deriving the replica of the undesired component is fully decoupled from the filtering operation. This has as advantage that the convergence properties of the means for deriving the replica of the undesired component are independent of the additional filtering.

A further embodiment of the invention is characterised in that the means for determining an estimate for the frequency spectrum of the interfering component are arranged for deriving the estimate for the frequency spectrum of the interfering component from the estimate of the interfering component.

At the output of the means for estimating the interfering component generally a good estimate of said interfering component is present. Using this signal for the determination of the frequency spectrum, results in a reliable estimation of said frequency spectrum.

A further embodiment of the invention is characterised in that the filter has a transfer function having an absolute value dependent on the difference of the amplitude of the frequency of the frequency spectrum of the input signal and the amplitude of the frequency spectrum of the estimate of the interfering component.

An easy way of deriving the transfer function of the filter is the subtraction of the estimate of the amplitude spectrum of the undesired component from the amplitude spectrum of the input signal. This subtraction operation is normally performed in the frequency domain, but the present invention is not limited thereto.

A very simple embodiment of the invention is characterised in that the means for determining an estimate for the frequency spectrum of the interfering component are arranged for determining the frequency of at least one peak in the frequency spectrum, and in that the filter is arranged for attenuating components in a frequency range around the frequency of the at least one peak.

The frequency peak or peaks can e.g. be determined by calculation of linear prediction parameters. The filter can have a transfer function being dependent on the prediction parameters.

BRIEF DESCRIPTION OF THE DRAWINGS

The invention will now be explained with reference to the drawings. Herein shows.

DETAILED DESCRIPTION OF THE PREFERRED EMBODIMENT

Figure 1:
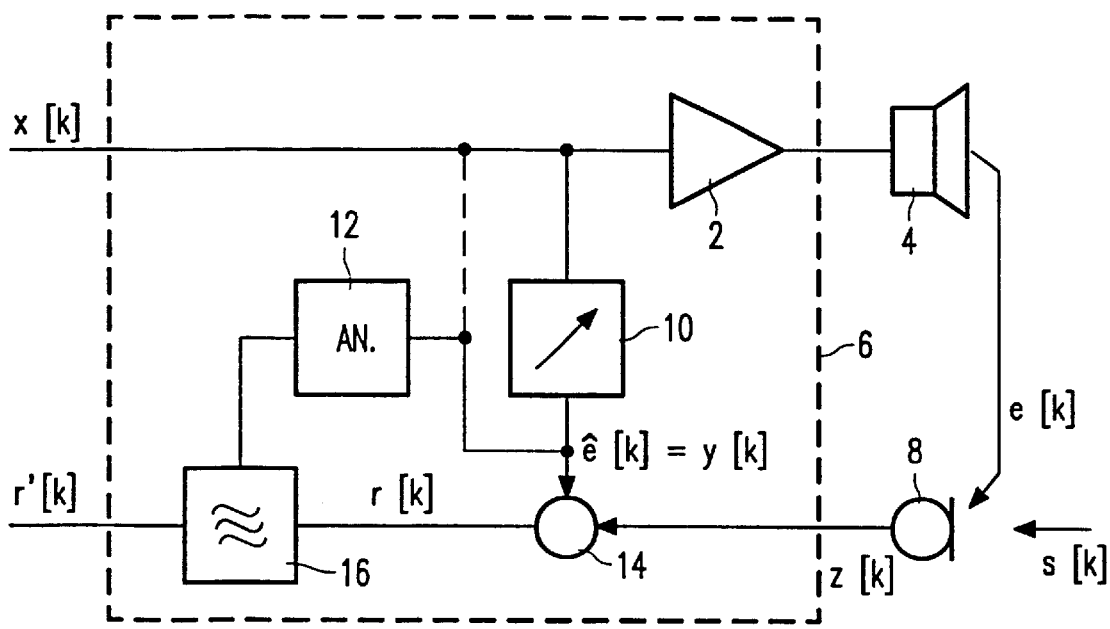
FIG. 1, a first embodiment of an arrangement according to the invention used in an echo canceller.

In the echo canceller according to FIG. 1, a signal x[k] is connected to a first input of a signal processing arrangement 6. In the arrangement 6, the signal x[k] is applied to an input of an amplifier 2 and to an input of the means for deriving an estimate of the interfering component, said means being here an adaptive filter 10. The output of the amplifier 2 is connected to an input of a loudspeaker 4.

The output of a microphone, carrying the input signal z[k] of the arrangement, is coupled to a first input of a subtracter 14. The output of the adaptive filter 10 is connected to a second input of the subtracter 14, and to an input of the means for determining an estimate of the frequency spectrum of the interfering signal, further to be referred to as spectrum determining means 12. The output of the subtracter 14 is coupled to an input of a filter 16. The output of the spectrum determination means 12 is connected to a control input of the filter 16. At the output of the filter 16 an estimate r'[k] of the signal s[k] is available.

In the echo canceller according to FIG. 1, the interfering component in the input signal z[k] is the signal e[k]. This signal e[k] is an echo signal caused by the reproduction of the far end signal by the loudspeaker 4. The adaptive filter 10 is arranged for deriving a replica ê[k] of the signal e[k]. This is in general done by choosing the coefficients of the adaptive filter for minimising the correlation between the signal r[k] and the signal x[k]. There exist several well known time domain algorithms for adjusting the coefficients of the adaptive filter, such as the LMS (Least Mean Square) algorithm, the NLMS (Normalised Least Mean Square) algorithm and the RLS (Recursive Least Square) algorithm. It is also possible that the adaptive filter operates in the frequency domain.

The spectrum determining means 12 determine the frequency spectrum of the output signal of the adaptive filter 10. From this frequency spectrum, the setting for the filter 16 is determined. The filter 16 is arranged for suppressing the spectral components of the output signal of the subtracter having a strong contribution from the interfering signal. It is conceivable that the input of the spectrum determining means is connected to the input of the adaptive filter 10 instead to its output, because the signal x[k] is also a reasonable estimate for the interfering component in the input signal. It is also possible that the estimate for the interfering component is made during the absence of the signal s[k]. In this case a speech activity detector has to be added to the arrangement. With respect to the position of the filter 16 it is observed that it is possible that the filter 16 is present between the microphone 8 and the subtracter 14.

Figure 2:
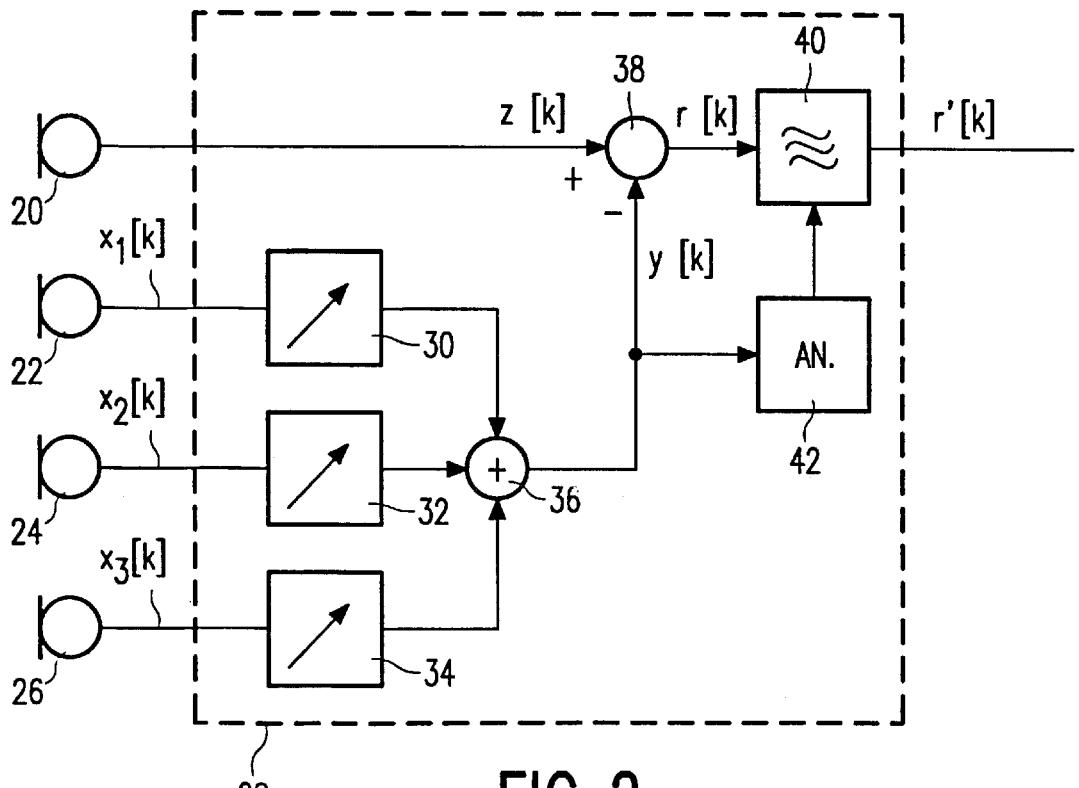
FIG. 2, a second embodiment of an arrangement according to the invention used in a noise canceller.

In the noise canceller according to FIG. 2, the output of a microphone 20, carrying output signal z[k], is connected to a first input of a signal processing arrangement 28. The signal z[k] is the input signal of the arrangement. In the arrangement 28 the signal z[k] is applied to a first input of a subtracter 38.

An output of a microphone 22, carrying output signal $x_1[k]$ is connected to an input of an adaptive filter 30. The output of the adaptive filter 30 is connected to a first input of an adder 36. An output of a microphone 24, carrying output signal $x_2[k]$ is connected to an input of an adaptive filter 32. The output of the adaptive filter 32 is connected to a second input of the adder 36. An output of a microphone 26, carrying output signal $x_3[k]$ is connected to an input of an adaptive filter 34. The output of the adaptive filter 34 is connected to a third input of the adder 36.

The output of the adder 36 is connected to a second input of the subtracter 38 and to an input of spectrum determining means 42. The output of the subtracter 38, carrying output signal r[k] is connected to an input of a filter 40. an output of the spectrum determination means 24 is connected to a control input of the filter 40. At the output of the filter the signal r'[k] substantially free from the interfering component is available.

The noise canceller according to FIG. 2 comprises four microphones 20, 22, 24 and 26. The microphone 20 is the primary microphone intended for receiving signals from a desired speaker. The microphones 22, 24 and 26 may be assigned to competing speakers whose speech is not to be passed to the output, but the microphones 22, 24 and 26 may also be reference microphones for receiving the interfering signal at three different positions in space. It goes without saying that the present invention is not limited to the application of three microphones for receiving the interfering signal. One microphone for receiving the interfering signal can be sufficient, but adding more microphones can improve the performance of the noise canceller. Each of the microphones 22, 24 and 26 is followed by an adaptive filter 30, 32 and 34 respectively. The combined signal y[k] derived from the output signals from the three adaptive filters 30, 32 and 34 is subtracted from the signal z[k] by the subtracter 38. The adaptive filters 30, 32 and 34 are individually adapted in order to minimise the correlation between the output signal of the subtracter 38 and its respective input signal. The same algorithms as in the adaptive filter 10 in FIG. 1 can be used. The spectrum determining means 42 determine the frequency spectrum of the output signal of the adder 36. The determined frequency spectrum is used to control the filter 40 for additional suppression of the interfering component in the output signal of the subtracter 38.

Figure 3:
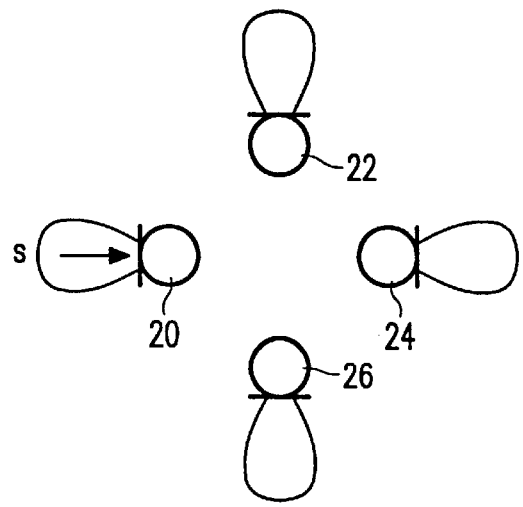
FIG. 3, the position of the microphones to be used in the embodiment according to FIG. 2.

FIG. 3 shows a possible arrangement of the four microphones 20, 22, 24 and 26 for use in an arrangement according to FIG. 2. This arrangement is suitable for a plurality of speakers. Due to the directivity of each of the microphones, the microphones 22, 24, 26 only receive reflections of the signal s instead of the signal s itself. This already leads to a suppression of the interfering component in the output signal of the noise canceller. By using the adaptive filters 30, 32 and 34 and the filter 40, the interfering components from the other speakers is effectively suppressed as is explained above.

Figure 4:
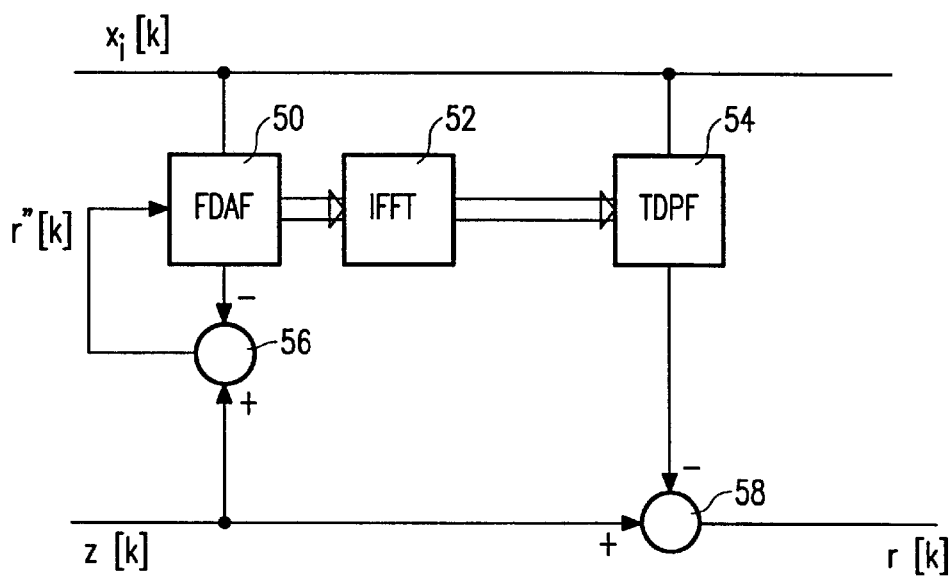
FIG. 4, an embodiment of the means for deriving a replica of the interfering signal to be used with the embodiment according to FIG. 1 or FIG. 2.
Figure 6:
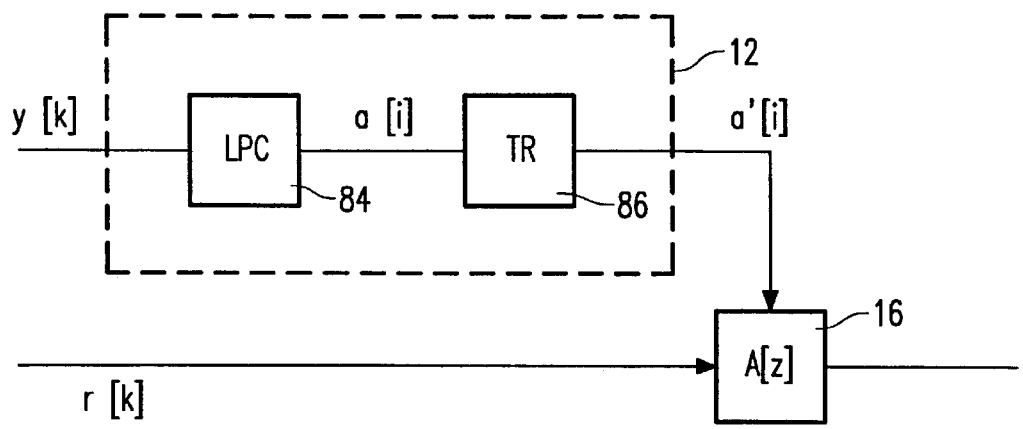
FIG. 6, a second embodiment of the combination of the means for estimating the frequency spectrum of the interfering component and the filter.

In the implementation of the adaptive filter according to FIG. 4, the signal $x_i[k]$ is applied to an input of a frequency domain adaptive filter 50, and to an input of a time domain programmable filter. The input signal z[k] is applied to a first input of a subtracter 58 and to a first input of a subtracter 56. The output of the time domain programmable filter 54 is connected to a second input of the subtracter 58. At the output of the subtracter 58, the output signal is available.

An output of the frequency domain adaptive filter 50 is connected to a second input of the subtracter 56. The output of the subtracter 56 is connected to a second input of the frequency domain adaptive filter 50. A second output of the frequency domain adaptive filter is connected to an input of an Inverse Fast Fourier Transformer 52. Said output of the frequency domain adaptive filter 50 carries the parameters of said frequency domain adaptive filter 50. The output of the Inverse Fast Fourier Transformer is connected to an input of the time domain programmable filter 54.

The adaptive filter 50 is realised in the frequency domain because a time-domain adaptive filter for the necessary length of the impulse response is of much greater complexity than a frequency-domain adaptive filter. In addition, a time-domain adaptive filter has the disadvantage that adapting its impulse response of the echo path for signals having a strong auto correlation takes much longer than for a frequency-domain adaptive filter for which a decorrelation that is simple to implement is used, introducing such decorrelation into a time-domain adaptive filter would involve much greater complexity.

In the frequency domain filter 50, blocks of samples of the signals $x_i[k]$ and $r''[k]$ are subjected to an orthogonal transform e.g. a Fast Fourier Transform to obtain the signals $X_i[p,m]$ and $R''[p;m]$, in which p is the normalised frequency, and m is the block number. In the frequency-domain filter 50 the correlation measure $X_i^*[p;m] \cdot R''[p;m]$ is calculated. Subsequently the frequency-domain coefficients $W[p;m]$ of the filter 50 are updated according to the LMS algorithm. For the frequency-domain coefficients can be written:

$$W[p;m]=W[p;m-1]+\mu[p;m] \cdot X_i^*[p;m] \cdot R''[p;m] \quad (1)$$

In (1) $\mu$ is a gain factor which may be dependent on the power of $X_i[p;m]$. The actual filtering takes place by multiplying the signal $X_i[p;m]$ by the coefficients $W[p;m]$ Subsequently the filtered signal is subjected to an Inverse Fast fourier transform to obtain the time-domain filtered signal to be applied to the second input of the subtracter 56. The frequency domain coefficients from the adaptive filter 50 are transformed into time-domain filter coefficients. These time domain filter coefficients are applied to the time-domain programmable filter 54, which actually determines the replica of the interfering component. The filter 9 is realised in the time domain because the signal to be filtered is not subjected to an additional delay in contradistinction to a frequency domain adaptive filter in which a certain additional delay is unavoidable.

Figure 5:
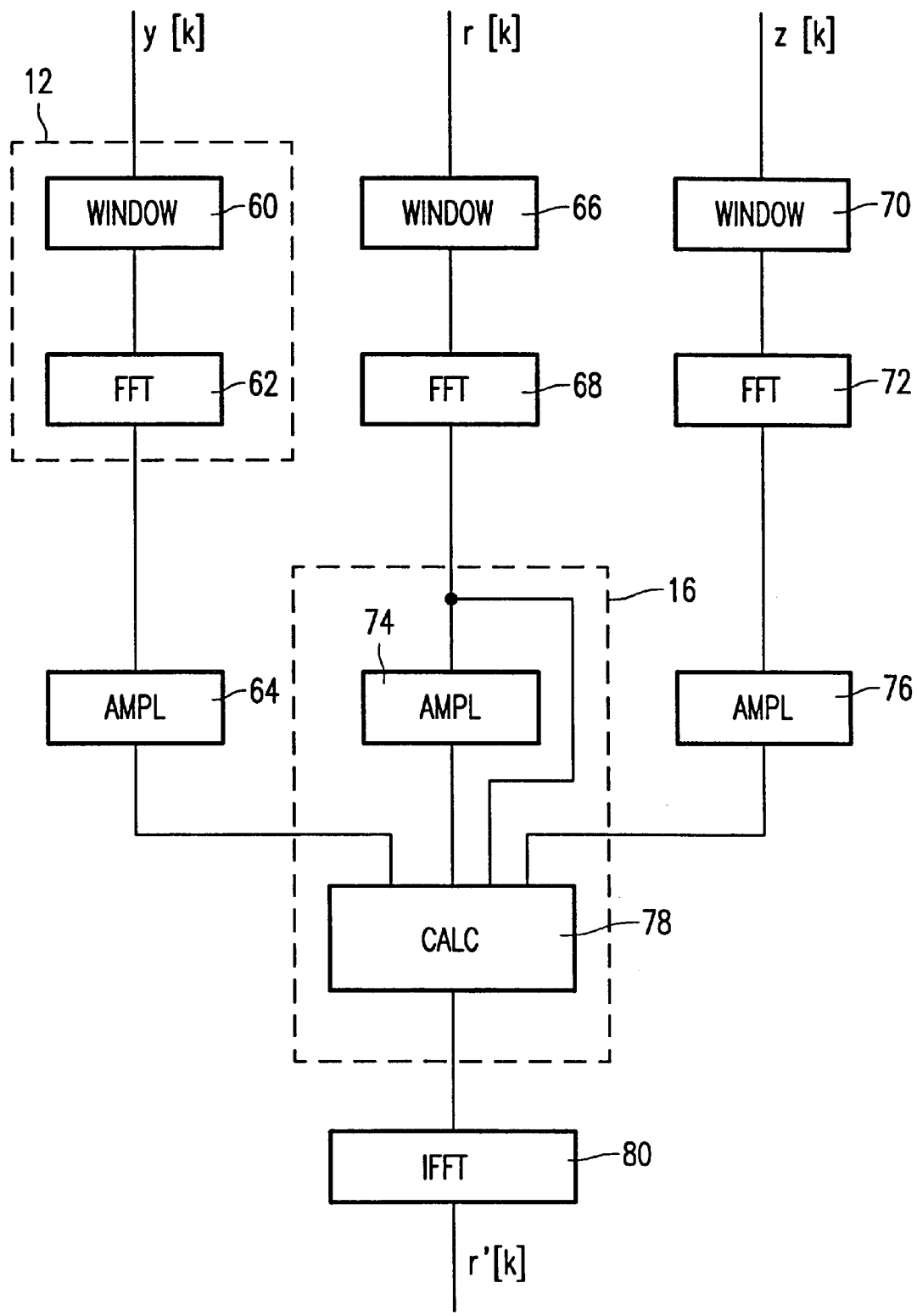
FIG. 5, a first embodiment of the combination of the means for estimating the frequency spectrum of the interfering component and the filter.

In the combination of the means 12 for estimating the frequency spectrum of the interfering component and the filter 16 according to FIG. 5, the signal y[k] is applied to a window processor 60. The output of the window processor 60 is connected to an input of an Fast Fourier Transformer 62. The combination of the window processor 60 and the Fast Fourier transformer 62 constitutes the means for determining an estimate of the frequency spectrum of the interfering component. The output of the Fast Fourier Transformer is connected to an amplitude detector 64, the output of the amplitude detector 64 is connected to a first input of a calculator 78.

The signal r[k] is applied to an input of a window processor 66. The output of the window processor 66 is connected to an input of a Fast Fourier transformer 68. The output of the Fast Fourier Transformer 68 is connected to an input of an amplitude detector 74 and to a second input of the calculator 78. The output of the amplitude detector 74 is connected to a third output of the calculator 78.

The signal z[k] is applied to a window processor 70. The output of the window processor 70 is connected to an input of an Fast Fourier Transformer 72. The output of the Fast Fourier Transformer 72 is connected to an amplitude detector 76. The output of the amplitude detector 76 is connected to a fourth input of the calculator 78.

The output of the calculator 78 is connected to an input of an Inverse Fast Fourier transformer 80. At the output of the Inverse Fourier Transformer 80 the output signal r'[k] is available.

In the window processor 66, the most recent block of 128 samples of the signal r[k] is placed together with the most recent block but one of 128 samples into a buffer memory of 256 samples. The content of the buffer memory is windowed with a so-called Hanning window. Subsequently the most recent block of 128 samples of the signal r[k] is stored for used in the next window operation, and the most recent block but one of 128 samples is discarded. The operation of the window processors 60 and 70 is the same as the operation of the window processor 66.

The Fast Fourier Transformers 62, 68 and 72 calculate a 256 points FFT from their respective input signals to obtain the signals $Y(\omega)$, $R(\omega)$ and $Z(\omega)$. The amplitude detectors 64, 74 and 76 determine the amplitude of the frequency spectrum according to:

$$Y_a(\omega)=|\Re\{Y(\omega)\}|+|\Im\{Y(\omega)\}| \quad (2)$$

$$R_a(\omega)=|\Re\{R(\omega)\}|+|\Im\{R(\omega)\}| \quad (3)$$

$$Z_a(\omega)=|\Re\{Z(\omega)\}|+|\Im\{Z(\omega)\}| \quad (4)$$

In (2), (3) and (4) $\Re\{x\}$ indicates the real part of x, and $\Im\{x\}$ indicates the imaginary part of x. The approximation of the amplitude of the frequency spectra according to (2), (3) and (4) is used to simplify the calculations.

The calculator 78 starts with calculating a first estimate of the amplitude of the frequency spectrum of the signal S. A possible expression for the amplitude spectrum $S_a$ of S is:

$$S_a(\omega)=\text{MAX}[0,(Z_a-\gamma(Y_a(\omega))^\alpha)^\beta] \quad (5)$$

In (5) $\alpha$ and $\beta$ are constants normally having a value between 0.5 and 2. $\gamma$ is a constant having a value around 1 or larger than 1. A suitable value is 1.5. The MAX function is introduced in (5) for preventing the amplitude spectrum to assume negative values. Experiments have shown that simplification of (5) by choosing $\alpha$ and $\beta$ equal to 1 does not result in any audible degradation. Consequently (5) changes into:

$$S_a(\omega)=\text{Max}[0,Z_a(\omega)-\gamma \cdot Y_a(\omega)] \quad (6)$$

In order to reduce the filtering action according to (6) in cases the adaptive filter 10 provides sufficient suppression of the interfering component, a spectral floor is introduced in (6) according to:

$$\forall\omega: S_a(\omega)=\text{MAX}[S_a(\omega),C \cdot Z_a(\omega)] \quad (7)$$

In (7) C is a constant having a value around 0.003. Because the amplitude spectrum $R'(\omega) \approx S(\omega)$ of the filtered signal r'[k] is equal to $H(\omega) \cdot R_a(\omega)$, for $H(\omega)$ can be written: $H(\omega)=S_a(\omega)/R_a(\omega)$. In order to limit the maximum value of $H(\omega)$, $H(\omega)$ is made equal to MIN(1, $S_a(\omega)/R_a(\omega)$). Before $H(\omega)$ is used to filter the signal r[k], a smoothed version of $H(\omega)$ is derived according to: In (8) m is the block number and $\mu$ is a constant with value of 0.7.

$$H_m(\omega)=\mu H_{m-1}(\omega)+(1-\mu)H(\omega) \qquad (8)$$

The frequency spectrum of the signal r'[k] is now determined from:

$$R'(\omega)=R(\omega)\cdot H_m(\omega) \qquad (9)$$

The output signal of the calculator 78 is transformed into the time domain by the 256 points Inverse Fourier transform 80. The first 128 points of the Inverse FFT are added to the final 128 points of the Inverse FFT previously calculated. The final 128 points of the present Inverse FFT are stored for combination with the first 128 points of the next IFFT to be calculated.

In the arrangement 5, the signal $Y_a(\omega)$ is determined directly from the output signal y[k] of the adaptive filter 10. However it is possible to obtain an even better estimation of $Y_a(\omega)$ Normally the length of the impulse response of the adaptive filter will be limited. Consequently the echo signal present in the signal z[k] will show a tail being not reproduced by the adaptive filter. However, it is possible to include this tail in the estimation of $Y_a(\omega)$ as will be explained below.

For the amplitude spectrum $Y_a(\omega)$ of the echo signal can be written:

$$Y_a(\omega)=Y_{af}(\omega)+Y_{tail}(\omega) \qquad (10)$$

In (10), $Y_{af}(\omega)$ is the amplitude spectrum of the output signal of the adaptive filter, and $Y_{tail}(\omega)$ is the amplitude spectrum of the residual echo. If it is assumed that the impulse response of the echo path decreases exponentially, the amplitude spectrum of the residual echo signal can be estimated from the output signal of the adaptive filter according to:

$$Y_{tail}[m](\omega)=\alpha\cdot Y_{tail}[m-1](\omega)+\beta\cdot Y_{af}[m-p](\omega) \qquad (11)$$

In (11) $\alpha$ and $\beta$ are constants, m is an index indicating subsequently determined amplitude spectra $Y_{af}(\omega)$, and p is the length of the adaptive filter expressed in a number of update periods of $Y_{af}(\omega)$. In case the signal Y is stationary, (11) can be approximated by $$Y_{tail}[m](\omega)=\alpha\cdot Y_{tail}[m-1](\omega)+\beta\cdot Y_{af}[m](\omega) \qquad (12)$$

For a filter having an impulse response of 1024 samples, and if an update period of 128 samples is used for $Y_{af}(\omega)$, suitable values for $\alpha$ and $\beta$ are 0.79 and 0.04 respectively.

In the combination of the means 12 for estimating the frequency spectrum of the interfering component and the filter 16, the signal y[k] is applied to a linear predictive analyser 84. This linear predictive analyser determines a plurality of prediction coefficients a[i]. The transformer arrangement 86 performs a transformation to the prediction coefficient such as a bandwidth expansion according to a'[i]=a[i]·$\delta^i$ in which $\delta$ is a number smaller than 1. The transformed prediction coefficients are used to control the filter 16, in order to suppress the frequency components for which the interfering component has a substantial amount of energy. A suitable filter could have the transfer function:

$$H(z) = \frac{1-\sum_{i=1}^{n} p^i\cdot a[i]z^{-i}}{(1+\mu\cdot z^{-i})\cdot\left(1-\sum_{i=1}^{n} q^i\cdot z^{-i}\right)} \qquad (13)$$

In (10) p, q and $\mu$ are constants smaller than 1 and p being smaller than q. (10) is based on the inverse transfer function of a post filter used in speech coding. The object of such a post filter is to enhance the part of the spectrum in which speech components are present, and to suppress noise components in the part of the spectrum in which no speech components are present. By taking a filter with an inverse transfer function, the part of the spectrum in which no interfering component is present is enhanced, and the part of the spectrum in which a strong interfering component is present is attenuated.

What is claimed is:

1. An arrangement for suppressing an interfering component in an input signal, said arrangement comprising a selection from singular and plural means for deriving an estimate of the interfering component, subtraction means for determining a difference signal from the input signal and an interfering estimate selected from the estimate of the interfering component and a sum estimate of at least two interfering components, means for determining an estimate of the frequency spectrum of the interfering component and an estimate of the frequency spectrum of the summed interfering components, a filter having an input for receiving said difference signal and an output for an output signal, and having a selectable transfer function relating said output to said input of the filter, which transfer function is reduced in value for at least one frequency range for suppressing spectral components of the output signal having a strong contribution from the interfering component, and means for setting the transfer function of the filter in dependence on the estimate of the frequency spectrum of the interfering component and the estimate of the frequency spectrum of the summed interfering components to define the at least one frequency range.

2. The arrangement according to claim 1, wherein the means for determining an estimate of the frequency spectrum of the interfering component is arranged for deriving the estimate of the frequency spectrum of the interfering component from the estimate of the interfering component.

3. The arrangement according to claim 2, wherein the filter has a transfer function having an absolute value dependent on the difference of the amplitude of the frequency of the frequency spectrum of the estimate of the interfering component.

4. The arrangement according to claim 3, wherein the means for determining an estimate of the frequency spectrum of the interfering component is arranged for determining the frequency of at least one peak in the frequency spectrum, and the filter is arranged for attentuation spectral components in a frequency range around the frequency of the at least one peak.

5. The arrangement according to one of the claim 2, wherein the means for determining an estimate of the frequency spectrum of the interfering component is arranged for determining the frequency of at least one peak in the frequency spectrum, and the filter is arranged for attenuating spectral components in a frequency range around the frequency of the at least one peak.

6. The arrangement according to claim 1, wherein the filter has a transfer function having an absolute value dependent on the difference of the amplitude of the frequency of the frequency spectrum of the estimate of the interfering component.

7. The arrangement according to claim 6, wherein the means for determining an estimate of the frequency spectrum of the interfering component is arranged for determining the frequency of at least one peak in the frequency spectrum, and the filter is arranged for attentuating spectral components in a frequency range around the frequency of the at least one peak.

8. The arrangement according to claim 1, wherein the means for determining an estimate of the frequency spectrum of the interfering component is arranged for determining the frequency of at least one peak in the frequency spectrum, and the filter is arranged for attentuating spectral components in a frequency range around the frequency of the at least one peak.

9. A loudspeaking telephone comprising an arrangement according to claim 1.

* * * * *